April 19, 1932.   F. T. ROOT   1,854,488
TIRE LOCK ASSEMBLY
Filed Sept. 14, 1927   2 Sheets-Sheet 1
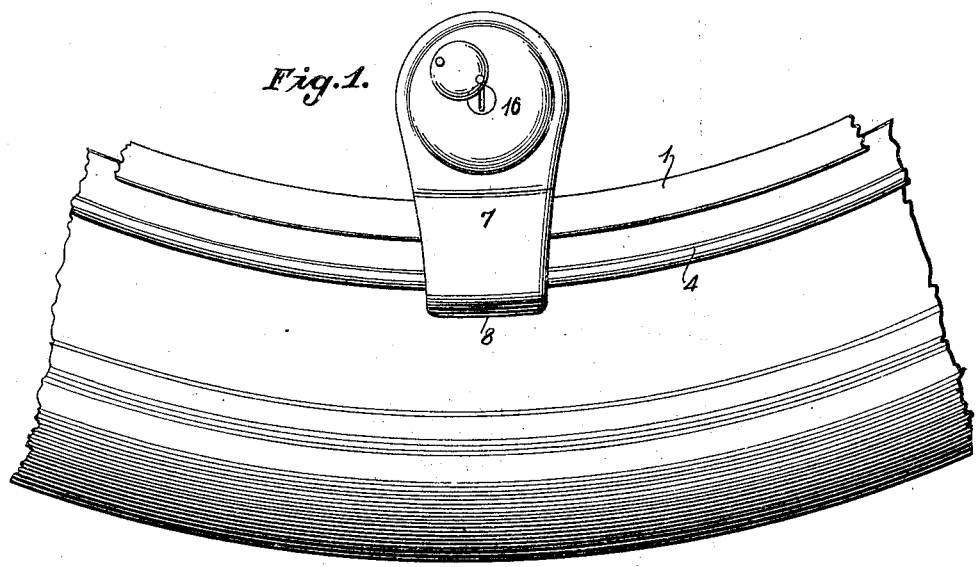
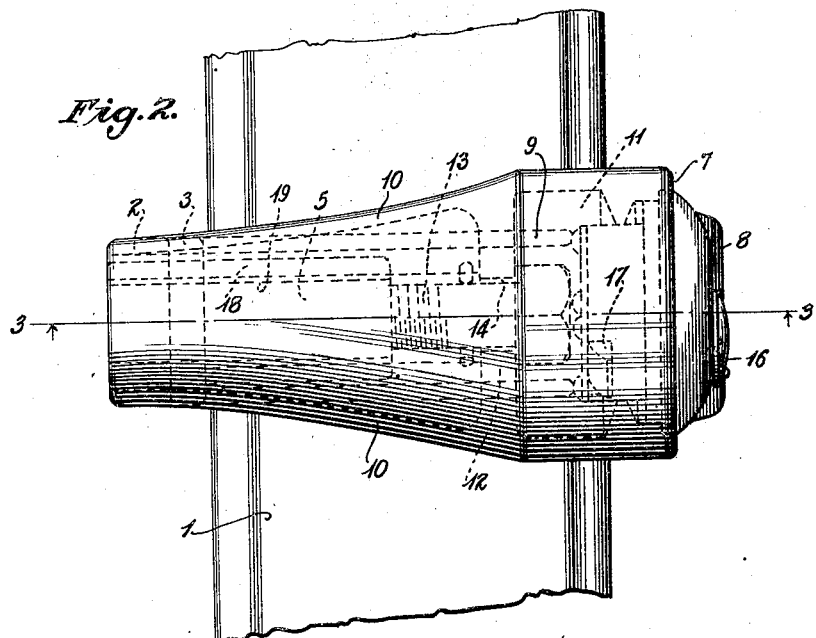
INVENTOR.
Frank T. Root
BY
ATTORNEYS April 19, 1932.  F. T. ROOT  1,854,488
TIRE LOCK ASSEMBLY
Filed Sept. 14, 1927  2 Sheets-Sheet 2
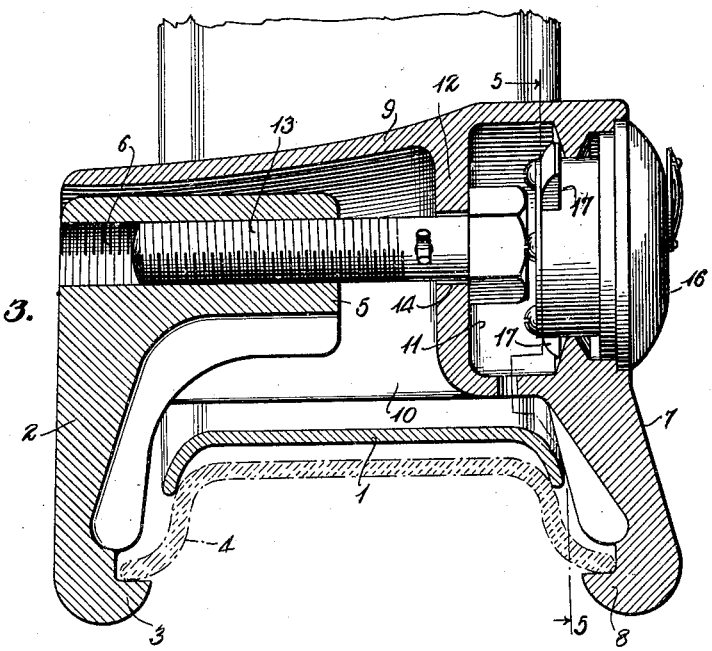
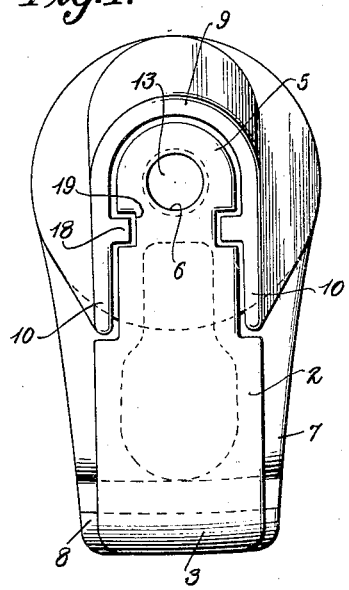
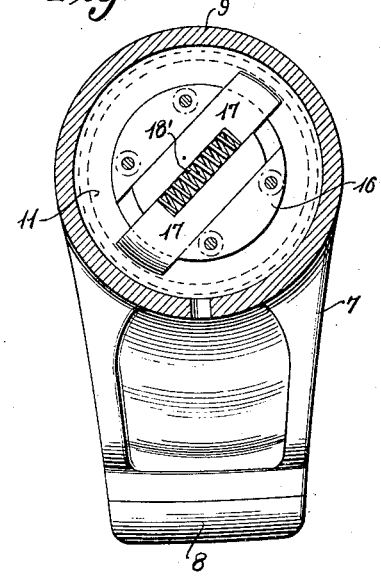
INVENTOR.
Frank T. Root
BY *Bacon & Thomas*
ATTORNEYS Patented Apr. 19, 1932

1,854,488

UNITED STATES PATENT OFFICE

FRANK T. ROOT, OF YORK, PENNSYLVANIA, ASSIGNOR, BY MESNE ASSIGNMENTS, TO OAKES PRODUCTS CORPORATION, A CORPORATION OF MICHIGAN

TIRE LOCK ASSEMBLY

Application filed September 14, 1927. Serial No. 219,526.

The invention relates to improvements in a tire locking assembly.

It is an object of the invention to provide a tire lock which may be easily applied to a tire carrier carrying a spare rim and tire for the purpose of preventing the removal of such rim and tire by an unauthorized person.

More specifically, the invention relates to an improved form of clamp lock housing and its associated clamp which will be more fully hereinafter described.

In the drawings Figure 1 represents an elevation of a portion of the tire with the locking device applied thereto, Fig. 2 is a detailed plan view, Fig. 3 is a section on line 3—3 of Fig. 2, Fig. 4 is an end view of the device, and Fig. 5 is a sectional view on line 5—5 of Fig. 3.

Referring now more particularly to the drawings wherein like reference characters indicate corresponding parts, the numeral 1 designates a section of a tire carrier which may be of any well known type. This carrier is adapted to detachably receive a spare rim and tire. The present invention relates to improved means for locking said rim on the carrier against removal by unauthorized persons.

The tire locking assembly embodies a clamp-jaw 2 having a peripheral clamping flange or hook 3 which fits around and engages the rim 4 carrying the spare tire. The upper end of this lock-jaw is provided with a lateral extension 5 having a centrally threaded aperture 6 passing therethrough by means of which the jaw is united to the carrier and the rim. This extension 5 extends within the space of the tire carrier and overlies the same as shown in Figure 1.

A cooperating clamp jaw 7 is provided, the same having at its forward end a depending hook or jaw 8 which fits the opposite side of a rim. This cooperating clamp jaw is preferably integral with the housing 9 and the side walls 10 of which extend a substantial distance beyond the clamping bolt receiving pocket 11. These walls overlap the lock-jaw when the parts are assembled, as is disclosed in Figure 1.

The housing is formed with the partition wall 12 which provides the bolt cavity or socket 11 which is open-ended, as clearly shown in Figure 2.

A bolt 13 has a threaded portion extending through an aperture 14 in this partition 12 and cooperates with complemental threads formed on the walls of the opening 6 of the clamp-jaw 2. The head of this bolt 13 is located in the socket 11. By tightening the bolt the lock-housing and the lock-jaw are drawn tightly into position with the demountable rim and extend around the tire carrier so that the rim is locked to the carrier when this housing and jaw are locked together. The bolt receiving socket 11 is, as before stated, open-ended. Near its open end, however, it is provided with a flange or continuous lug 15. This open end of the socket is adapted to detachably receive a self-contained locking assembly 16. This assembly embodies the usual key-operated mechanism and carries a pair of spring-pressed locking bolts 17. These bolts have their outer faces beveled so that they can be readily slipped over the flange 15 and the spring 18' then urges them outwardly behind the inner surfaces of said flange, thereby retaining the locking assembly in position. To remove this self-contained lock a key is employed which when rotated withdraws these bolts from the flange 15 and permits the entire assembly to be withdrawn whereupon the head 15 of the bolt 13 can be operated to permit the application or removal of the assembly.

It will also be appreciated that the side walls 7 of the housing carry horizontal ribs 18 which are adapted to engage complemental grooves 19 formed in the clamp jaw 2.

This prevents a relative rotation of the parts when assembled.

Having thus described my invention, what I claim is:

1. A device of the character described, comprising a clamp jaw having a threaded aperture therein, a housing overhanging and concealing the portion of the clamp jaw having the said threaded aperture therein, means for drawing said housing and clamp jaw toward one another, interlocking connections between said housing and said clamp jaw to prevent relative turning thereof, said housing having an open-ended pocket therein, and a removable lock controlled closure cooperating with the walls at the outer end of said socket.

2. A device of the character described, comprising a clamp jaw, a clamp housing, both the clamp jaw and the housing having clamping extensions adapted to engage a positioned rim, said clamp housing having a pocket therein, a fastening member having an enlarged head seated in said pocket with one end cooperating with said clamp jaw, whereby the clamp jaw and the clamp housing are drawn together, and a removable lock controlled closure for said pocket.

3. A locking device for spare tires for automobiles adapted to be applied as a unit to a spare tire and its supported rim, said device including a clamp jaw having a lateral extension provided with a screw-threaded bore, a cooperable clamp jaw, means for receiving a bolt and constraining it against longitudinal movement upon rotation thereof, said bolt having a threaded portion engageable with the bore in the extension of the first named jaw, a pair of ribs in one of the jaws and a pair of grooves in the other adapted for interlocking connection to prevent surreptitious rotation of one of the jaws relative to the other, and means for locking the bolt against unauthorized rotation.

4. A locking unit adapted for attachment to a spare tire, comprising a clamp jaw having a screw-threaded bore, a cooperable clamping jaw and a housing telescopically receiving the first mentioned jaw, a bolt associated with said housing and engageable with the bore of the first mentioned jaw to effect spreading action, said housing having inturned ribs engageable with grooves in the first-mentioned jaw to prevent rotation of one of the jaws relative to the other, and means for locking the bolt against unauthorized rotation, said housing overhanging and concealing the threaded portion of the bolt and sealing it against access when the locking unit is in operative position.

5. In combination in a tire lock, a first clamping member, a second clamping member, said members including means for engaging the rim of a tire, means for preventing relative angular movement of said members including telescoping parts associated with said clamping members, means for enabling said members to be held in cooperation with each other, and a lock for locking said members in cooperation and against separation, said telescoping parts including a male portion connected to one of said clamping members and a female portion for receiving the male portion, one of said portions having a lug adapted to extend into a slot in the other portion.

In testimony whereof I affix my signature.

FRANK T. ROOT.